United States Patent [19]
Pirre

[11] 3,742,507
[45] June 26, 1973

[54] AUTOMATIC GOLF BAG CART

[76] Inventor: John E. Pirre, 136 Cold Spring Road, Stamford, Conn.

[22] Filed: Sept. 10, 1970

[21] Appl. No.: 71,113

[52] U.S. Cl. ............... 343/22 S, 180/98, 180/79.1, 318/16, 318/587, 46/244 B, 325/393
[51] Int. Cl. .................... G08c 17/00, A63h 30/00
[58] Field of Search.................. 343/225, 228, 224, 343/112 D; 325/390, 393, 29; 180/2, 79, 79.1, 98; 318/16, 570, 581; 46/244 R, 244 A, 244 B, 244 D

[56] References Cited
UNITED STATES PATENTS

| | | | |
|---|---|---|---|
| 2,836,253 | 5/1958 | Lovell.............................. | 180/79.1 X |
| 3,473,623 | 10/1969 | Meek................................. | 180/79.1 |
| 3,046,549 | 7/1962 | Kalmus ..................... | 343/112.3 UX |
| 3,121,228 | 2/1964 | Kalmus ..................... | 343/112.3 UX |
| 3,472,333 | 10/1969 | Loewenstern........................ | 180/98 |
| 3,563,327 | 2/1971 | Mier ................................. | 318/587 X |
| 3,009,271 | 11/1961 | Kuehne et al............... | 318/587 UX |
| 2,769,601 | 11/1956 | Hagopian et al................ | 343/225 X |
| 3,011,580 | 12/1961 | Reid....................................... | 340/53 |
| 3,247,740 | 4/1966 | Shuster ................................. | 180/98 |
| 3,442,347 | 5/1969 | Hodgson et al....................... | 180/98 |
| 3,542,148 | 11/1970 | Wilson............................ | 180/98 X |

Primary Examiner—John W. Caldwell
Assistant Examiner—William M. Wannisky
Attorney—Clarence A. O'Brien & Harvey B. Jacobson

[57] ABSTRACT

A battery-powered golf bag cart responsive to signals from a movable transmitter carried in the pocket of a golfer, the cart and transmitter being preferably electromagnetically coupled to each other, a receiver in the cart for picking up signals from the transmitter, a battery powered motor for moving the vehicle along the ground towards the transmitter, means for steering the vehicle in the direction of the golfer, brake means for sometimes preventing movement of the vehicle, speed control means in the receiver and responsive to signals within a given range of signal strength for actuating the motor to drive the vehicle towards the golfer, steer control means in the receiver for sensing the position of the golfer and for steering the vehicle towards the golfer, and a stop-control circuit in the receiver responsive to signals (or no signal) falling outside of the predetermined range of signal strength for actuating the brakes and for simultaneously preventing actuation of the drive motor.

13 Claims, 7 Drawing Figures

Patented June 26, 1973

JOHN E. PIRRE
INVENTOR.

BY
William S. Dorman
ATTORNEY

JOHN E. PIRRE
INVENTOR.

BY
William S. Dorman
ATTORNEY

JOHN E. PIRRE
INVENTOR.

BY
William S. Dorman
ATTORNEY

JOHN E. PIRRE
INVENTOR.

BY
*William S. Dorman*
ATTORNEY

AUTOMATIC GOLF BAG CART

The present invention relates to an automatic golf bag cart and, more particularly, to a cart fully capable of following the movements of a golfer over the golf course within predetermined limits of minimum and maximum signals transmitted.

In the past, many different types of golf bag carts have been constructed and/or proposed for the purpose of facilitating movement of the golf bag over the golf course in such a manner as to permit ready access of the golf clubs to the golfer. There have also been some manually controlled motorized golf bag carts which are moved over the golf course under the actual physical control of the golfer who remains in physical contact with the golf bag cart under these conditions. Certain of the radio controlled, and/or acoustically controlled, carts require the operator, at a remote position, to transmit signals of various types and characters to the cart in order to initiate its movement from the remote position towards and to the golfer. In this regard, there is no golf bag cart or similar vehicle which is fully automatic and completely capable, on its own, to follow the golfer as he moves over the golf course.

The present invention, on the other hand, is essentially fully automatic; that is, when the power is turned on in the cart and in the transmitter which the golfer will carry in his pocket, the cart will follow the golfer over the golf course wherever he may go. The cart has means to sense the position of the golfer and will steer towards him at all times. Also, the cart will not move if the transmitter is turned on at a distance beyond a predetermined maximum distance from the cart. Also, the cart will move up to the golfer and will automatically stop within a predetermined minimum distance from the golfer.

Therefore, it is a principal object of the present invention to provide an automatic golf bag cart or similar vehicle capable of following the movements of an operator (golfer) who carries a transmitter with him.

It is a further object of the present invention to provide a transmitting and receiving system for the transmitter and cart, respectively, which will permit the cart to follow the golfer at all times when the signal received at the cart falls within a given range of signal strengths.

It is a further object of the present invention to provide a transmitting and receiving system wherein the coupling is preferably electromagnetic.

It is a further object of the present invention to provide a transmitter and receiver of the type referred to herein which includes a means for sensing the position of the golfer and for controlling the steering of the cart.

It is a further object of the present invention to provide a transmitter and receiver of the type referred to herein which, when the signal strength at the cart falls outside of the predetermined range of signal strengths, will actuate a brake means and simultaneously prevent actuation of the motive means.

It is a further object of the present invention to provide a transmitter and receiver of the type referred to herein which will include a means for preventing the vehicle from overtaking the golfer on a downgrade.

It is a further object of the present invention to provide a transmitter and receiver of the type referred to herein which includes a means for causing the cart to move at an essentially constant speed under load or when traveling up an incline.

It is a further object of the present invention to provide a transmitter and receiver of the type referred to herein which includes a speed control means that will tend to move the cart at a greater rate of speed when it is more remote from the golfer and at a slower rate of speed as it approaches the golfer.

It is a still further object of the present invention to provide a transmitter and receiver of the type referred to herein which includes a manual override which will permit the golfer to operate the cart manually to get by obstructions such as bridges and the like.

Other and further objects and advantageous features of the present invention will hereinafter more fully appear in connection with a detailed description of the drawings in which.

Figure 2:
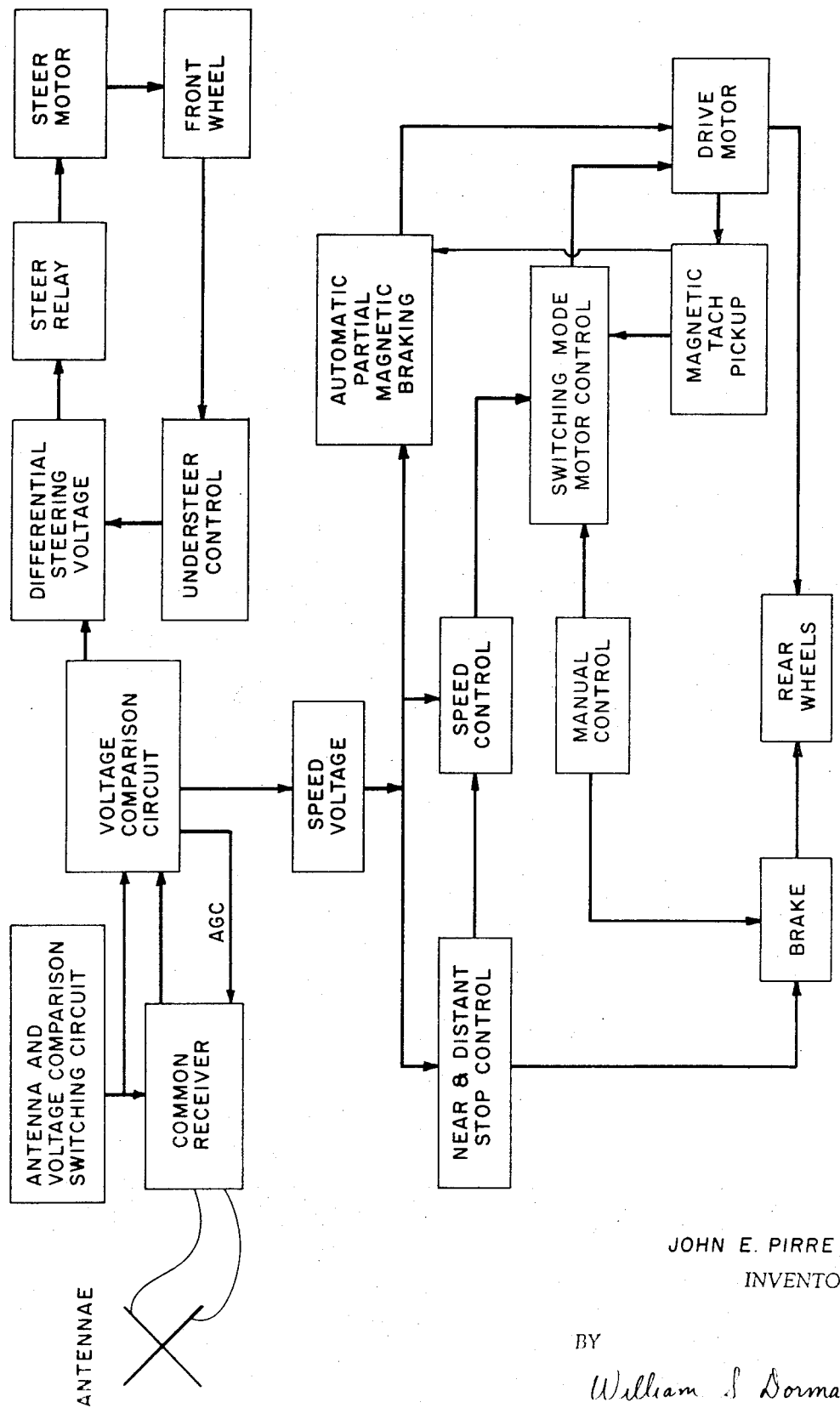
FIG. 2 is a block diagram similar to FIG. 1 showing a modification thereof.
Figure 3B:
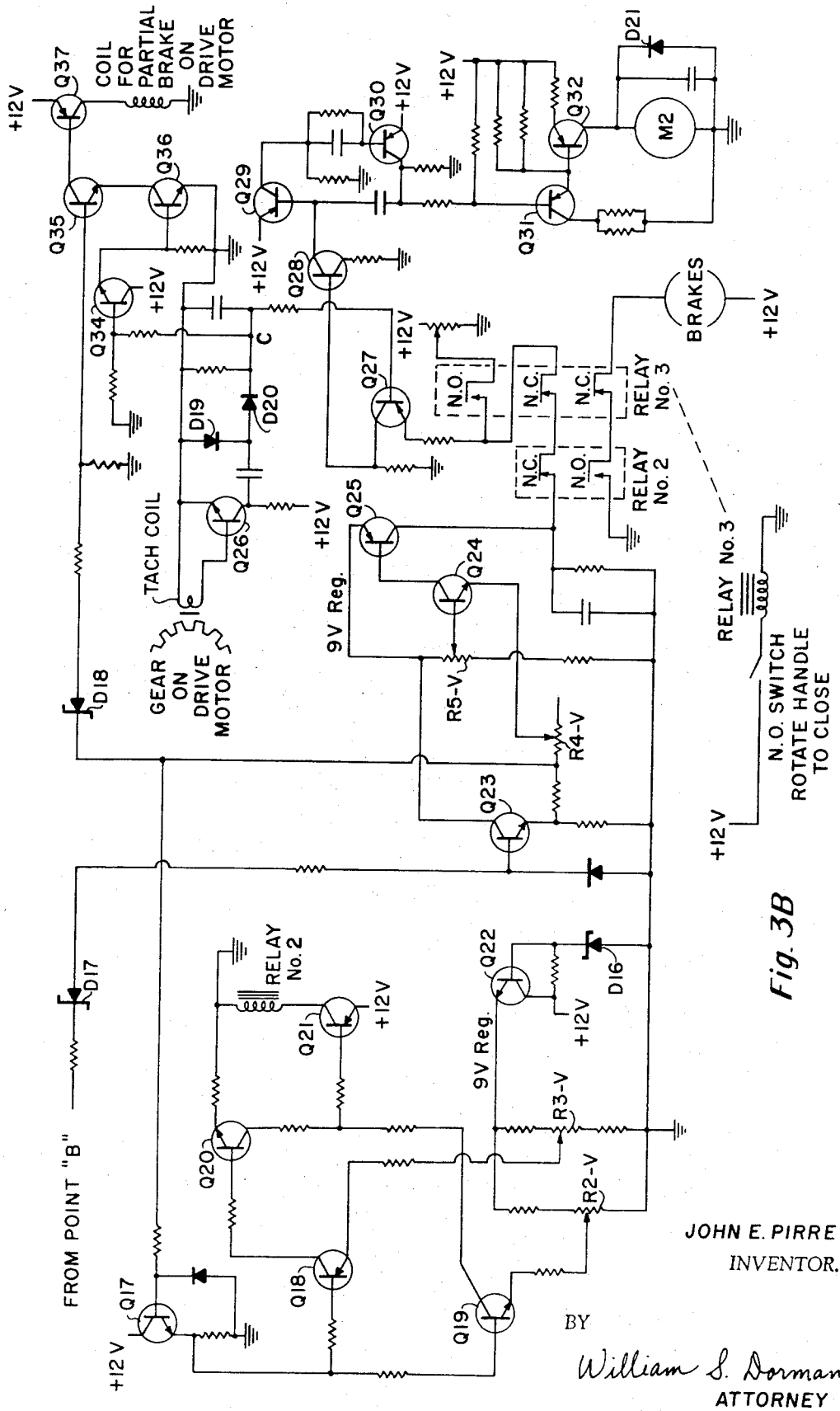
Figure 3A:
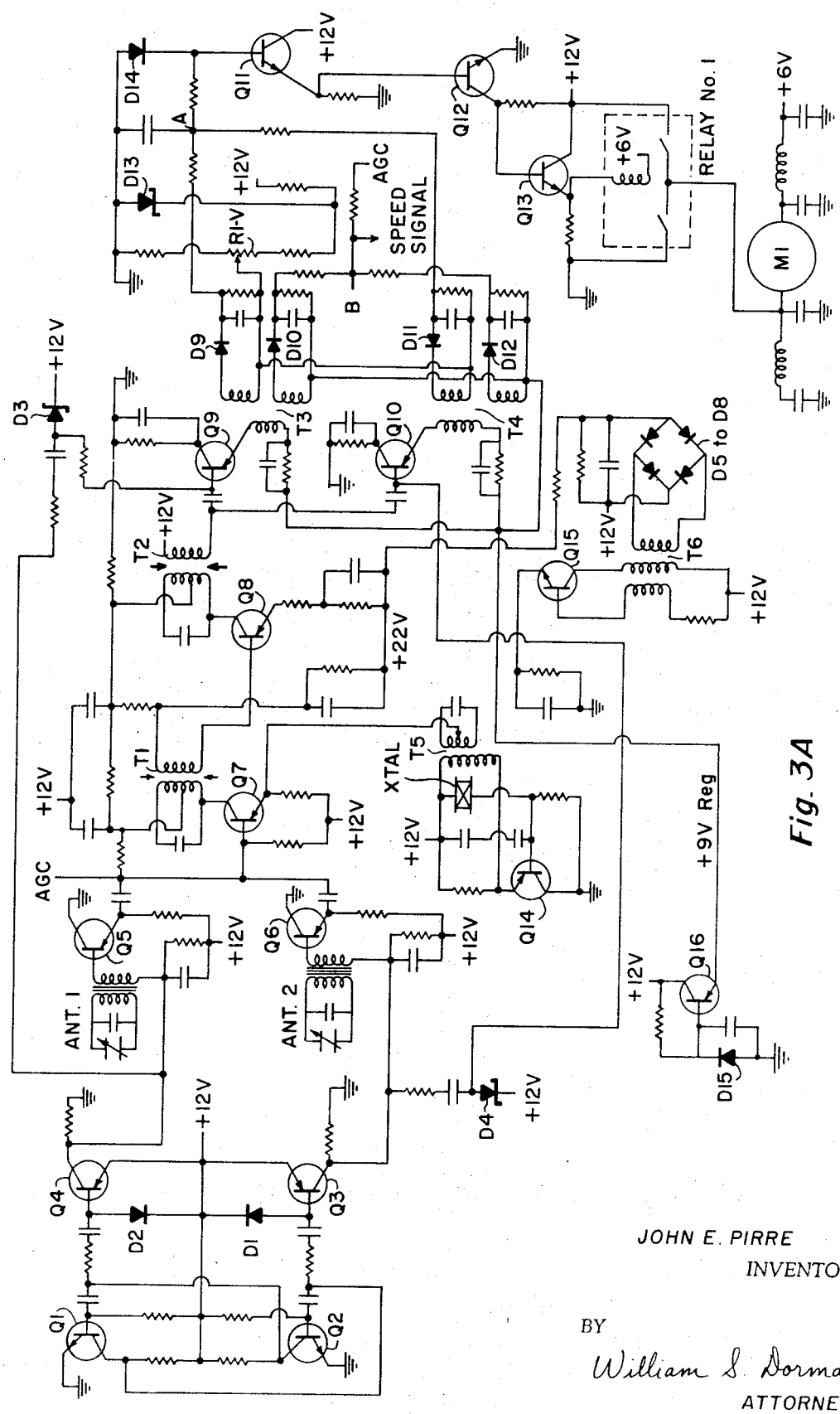
Figure 4:
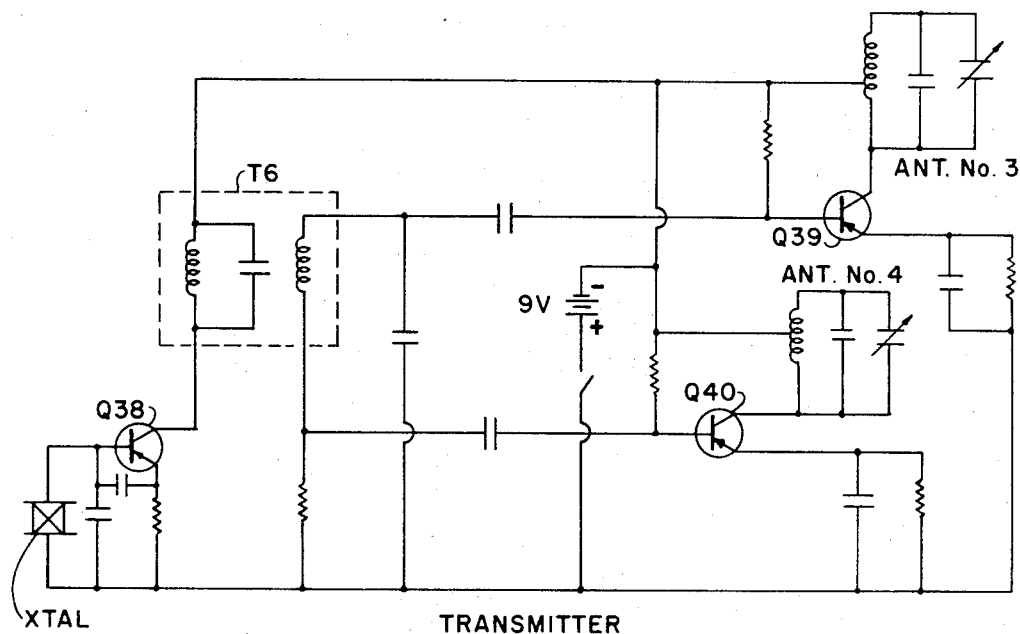
Figure 5:
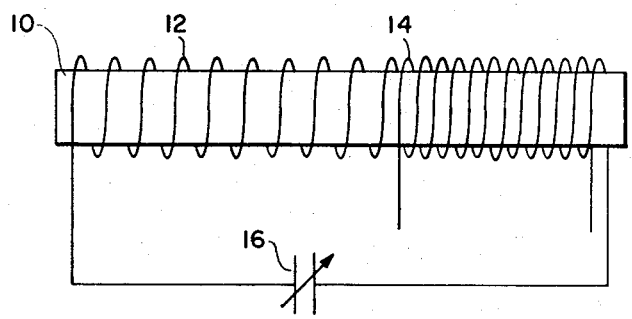
Figure 6:
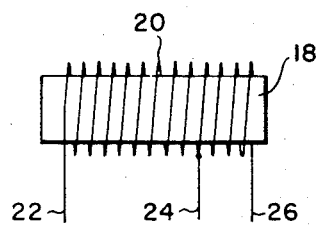

FIGS. 3A and 3B together represent the circuit diagram corresponding to the embodiment of FIG. 2;

FIG. 4 is a circuit diagram for the transmitter of the present invention;

FIG. 5 is a semi-diagrammatic representation of one of the antennae used in the receiver of the present invention; and FIG. 6 is a semi-diagrammatic representation of one of the antennae used in the transmitter of the present invention.

Figure 1:
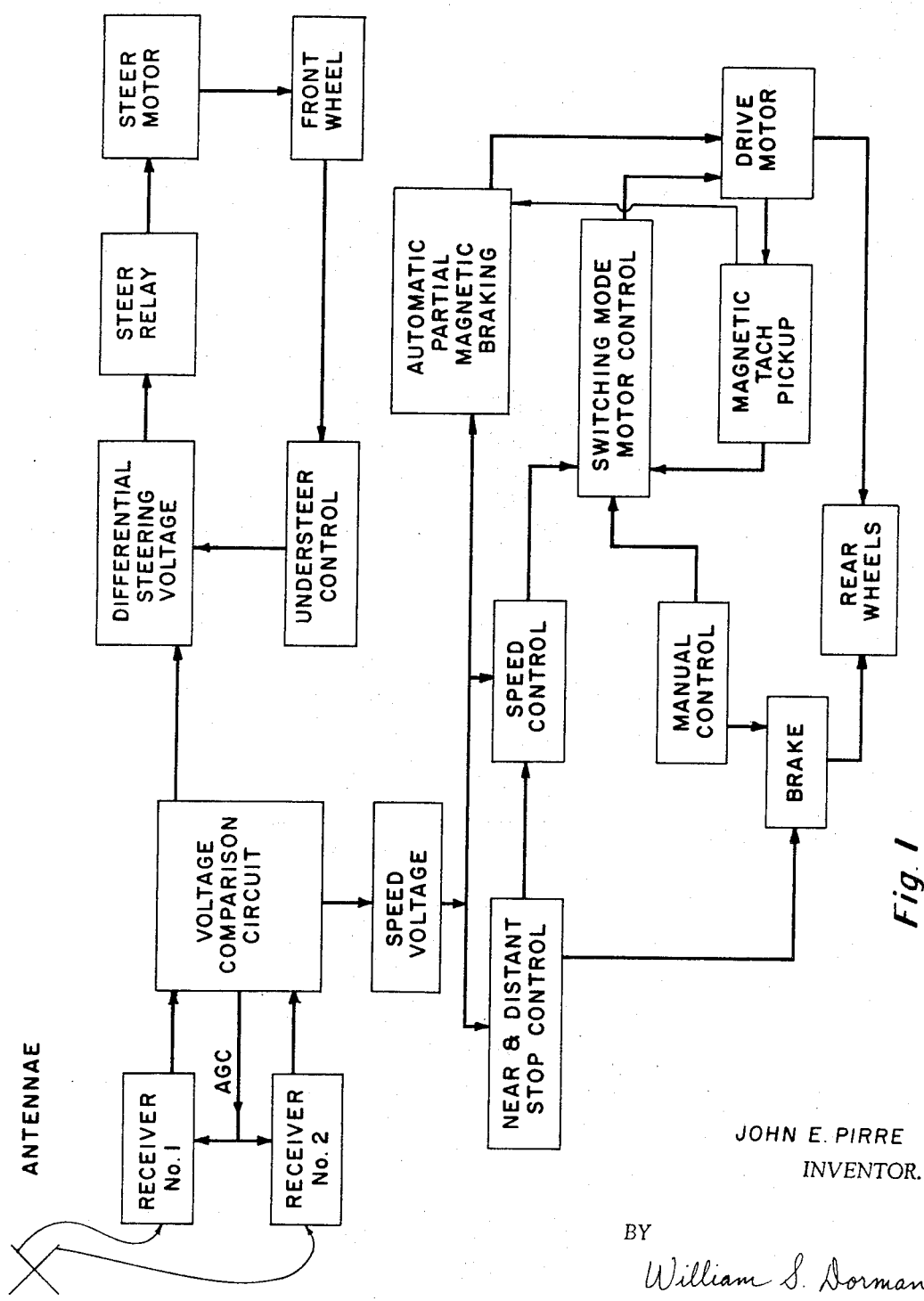
FIG. 1 is a block diagram of the receiver and control system employed in the golf bag cart according to one embodiment of the present invention.

Referring to the drawings in detail, an RF signal of approximately 1715 K.C. is picked up by the two antennae shown in FIG. 1 as a result of magnetic coupling between these antennae and those on the transmitter as will hereinafter appear. The two antennae are set at 90° with respect to each other both physical and electrically. In FIG. 1, the output from one antenna is fed into Receiver No. 1 and output from the other antenna is fed into Receiver No. 2. The Voltage Comparison Circuit takes the output from both receivers and does two things with these signals; first of all, it senses the difference in the strength of the two signals received from the receivers and feeds this difference into the Differential Steering Voltage circuit. If there is no difference then there is no steer signal. Secondly, the Voltage Comparison Circuit sums and averages the signals received from the two receivers so as to provide a signal for the Speed Voltage to cause the golf bag cart to move towards the operator.

Returning now to the steering circuit, which will be described in greater detail in connection with a description of FIGS. 3A and 3B (although the latter figures more truly represent the diagrammatic illustration of FIG. 2), in the event that there is a difference in signal strength from the two receivers, the Differential Steering Voltage circuit will send a signal to a Steer Relay which in turn will provide a signal to the Steer Motor, the voltage and polarity of this signal being such as to cause the Steer Motor to turn in the direction of the operator. The Steer Motor turns the Front Wheel on which is mounted a potentiometer referred to in FIG. 1 as "Understeer Control." The Understeer Control serves more or less as a means of decreasing the effect of the steer signal to prevent the golf bag cart from following the operator in a zig-zag pattern.

The signal from the Speed Voltage is fed into three different circuits; namely, a Near and Distant Stop Control circuit, a Speed Control circuit and an Automatic Partial Magnetic Braking circuit. The signal from the Speed Control goes through a Switching Mode Motor Control and thence to the Drive Motor which drives the Rear Wheels of the three-wheeled cart. The Switching Mode Motor Control is such that, within certain limitations, the signal to the Drive Motor is inversely related to the signal received from the Speed Control circuit; that is, when the signal is relatively weaker (representing a relatively greater distance of the cart from the operator), the tendency is to drive the Drive Motor at a relatively greater speed so as to "catch up" with the operator. However, when the cart is beyond a predetermined distance from the operator the signal from the Speed Voltage circuit will be sufficiently low as to actuate the "distant" portion of the Near and Distant Stop Control; the Near and Distant Stop Control will feed a signal into the Speed Control circuit to prevent the speed signal from being applied to the Switching Mode Motor Control. Simultaneously, the Near and Distant Stop Control will feed a signal to the Brake which will act upon the Rear Wheels to prevent movement of the cart.

Conversely, when the cart is very close to the operator, say within three or four feet, the signal from the Speed Voltage circuit will be sufficiently high to actuate the "near" portion of the Near and Distant Stop Control; the Near and Distant Stop Control will, under these circumstances, also feed a signal to the Speed Control circuit to prevent any signal being supplied to the Switching Mode Motor Control and at the same time a signal will be fed to the Brake to prevent movement of the cart. The Drive Motor, Speed Voltage circuit, and Automatic Partial Magnetic Braking circuit are interconnected (as will more fully appear in connection with a description of FIG. 3) to prevent the cart from moving too rapidly as, for example, when going down a hill.

Conversely, the Drive Motor is provided with a Magnetic Tach Pickup which feeds into the Switching Mode Motor Control for the purpose of driving the Drive Motor at a substantially constant speed as, for example, when under load or traveling up a hill.

FIG. 2 represents a modification of the overall system shown in FIG. 1 wherein Receiver No. 1 and Receiver No. 2 are replaced by a Common Receiver. The "Antenna and Voltage Comparison Switching Circuit" is provided so that the antennae alternately feed into the Common Receiver and into the Voltage Comparison Circuit to provide essentially the same overall effect as results in FIG. 1. The remainder of FIG. 2 is the same as what has already been described in connection with FIG. 1 and will not be repeated herein. In both FIGS. 1 and 2 there is shown a return line from the Voltage Comparison Circuit to the receiver or receivers labeled "AGC." This is not truly AGC in the conventional sense but it operates above certain voltage levels to reduce the gain of the receiver or receivers.

Referring now to FIGS. 3A and 3B which show the circuit details of FIG. 2, the signal from the transmitter is picked up by antennae 1 and 2 which are coupled to the base circuits of transistors Q5 and Q6, respectively. Free running multivibrators Q1 and Q2 (approximately 100 cps) alternately switch Q5 and Q6 on and off, into and out of conduction. Q3 serves as a squarer for the switching signal from Q2 to Q6. Q4 serves as a squarer for the switching signal from Q1 to Q5.

Q14 and the associated crystal ("XTAL") serves as a 1260 K.C. local oscillator. Q7 serves as a mixer and first I.F. stage (455 K.C.). Q8 is the second I.F. stage.

Transistors Q9 and Q10 are alternately switched on and off in the same manner that Q5 and Q6 are switched on and off; that is, the switching signal from Q4 is shaped by the zener diode D3 and fed to the base of Q9; similarly, the switching signal from Q3 is shaped by the zener diode D4 and fed to the base of Q10. Transformers T3 and T4 are tuned to 455 K.C. and each has dual secondaries. The upper winding of the secondary of T3 develops a positive voltage with respect to the center arm of potentiometer R1-V. The upper winding of the secondary of transformer T4 develops a negative voltage with respect to the center arm of potentiometer R1-V. These two voltages are mixed at point A.

Assuming that the front wheel (to which the antennae are attached) is aiming straight ahead and that the transmitter (with the operator) is also straight ahead or in a position so as to bisect the angle formed by the two antennae, equal and opposite voltages will be developed at the upper windings of the secondaries of transformers T3 and T4. This will be condition would result in zero voltage at point A.

We will now assume that the transmitter (in the golfer's pocket) moves either to the right or left of the position described immediately above. At this point an error voltage will be developed at point A which will be either positive or negative voltage depending upon whether the golfer moves to the left or right. This error voltage will be amplified by Q11, Q12 and Q13. The emitter of Q13 is connected to a polar Relay No. 1 whose other end is connected to plus six volts. This relay is a three-position, center stable relay with two SPSTNO contacts. Q13 is connected into the circuit in such a way that there will be six volts at its emitter when there is no error signal at point A. This means that there will be a voltage of plus six volts across both ends of the coil of Relay No. 1 and the relay will be inactive; however, with an error signal at point A, as would result from the second condition referred to herein, the emitter of Q13 will be pulled towards zero or plus twelve volts depending upon whether the error signal is plus or minus. The direction of current flow through the relay coil will determine which of its two contacts will close, the other contact, of course, remaining open. One end of the Steer Motor M1 is connected to plus six volts. The other lead to the motor is attached to a common connection of the two contacts of the Relay No. 1. This common connection will assume a potential of zero or plus twelve volts (depending upon the polarity of the error signal). Thus, the motor will draw a current and turn in one direction or the other (again depending upon the polarity of the error signal) to rotate the front wheel and antennae until no error signal is received at point A.

Potentiometer R1-V is rotated by the turning action of the front wheel. The center arm of R1-V is the reference point of error voltage and since, as indicated above, it changes with the steering action of the front wheel, it will introduce an understeering condition to the steering system to prevent the cart from following in a zig-zag fashion. In effect, movement of the center arm of R1-V reduces the error voltage such that the steering wheel will not overshoot the actual direction to the transmitter due to the inertia of the steering wheel or of its motor, or due to other factors affecting the time response of the steering system. By selecting the proper resistance value for R1-V, the degree of understeer or oversteer of the cart may be preset.

Q15 is part of an oscillator circuit whose developed AC voltage is rectified by the bridge circuit D5 to 8, inclusive. The resulting rectified DC voltage (plus 10 volts) is applied to transistor Q8 in series with the battery voltage to provide plus 22 volts (as indicated below the resistors leading into the emitter of Q8). The purpose of the plus 22 volts is to prevent overloading when the transmitter is very close to the cart. Transistor Q16 and zener diode D15 make up a voltage regulator circuit to hold the voltage input to the emitter circuits of Q9 and Q10 at plus nine volts regardless of the load on the battery.

The lower coils of the secondaries of transformers T3 and T4 produce positive voltages with respect to regulated 9 volts. When the cart is aimed straight ahead these voltages will be equal. When the cart steers, these voltages will change with respect to each other, but, since they are mixed (averaged) at point B, the resultant voltage at point B will not change appreciably due to steering. The voltage at this point will be dependent primarily upon the distance that the cart is from the golfer (transmitter). The voltage at point B is used as a feedback to the receiver (as previously explained), as a Speed Control, and as an automatic shut off should the cart be either too close to, or too distant from, the golfer and transmitter.

Turning now to FIG. 3B, the interconnection from FIG. 3A to FIG. 3B is from point "B" through the resistor to the zener diode D17. Zener diodes D17 and D18 are used to keep the swing of voltage within the battery voltage. Transistors Q17 and Q23 are emitter followers with no voltage gain and serve as high input impedance, low output impedance, devices so as not to load down preceding stages. Transistors Q18, Q19, Q20 and Q21 comprise the circuit that shuts off power to the drive motor M2 and energizes the brakes when the cart is beyond the close and distant limits referred to herein. Potentiometers R2-V and R3-V are used to adjust the threshold of near and distant shut-off, respectively, of power to the Drive Motor and simultaneous application of Brakes.

The manner in which Relay No. 2 is energized by signals from too near and too distant locations is as follows. The signal from point B comes through the zener diode D17 and is impressed upon the base of transistor Q23 which, as previously described, acts as an emitter follower. The signal is taken off the emitter of Q23 and applied to the base of Q17. Thus the signal on the resistor in the emitter circuit of Q17 will be proportional to the signal received from point B. Potentiometers R2-V and R3-V are part of a voltage divider network across the nine volts regulated provided by Q22. A positive potential from R2-V is applied to the emitter of Q19. This potential will represent the "near" condition for stopping the cart when it gets too close to the transmitter; thus, when a signal from the transmitter representing a "near" condition is impressed across the emitter resistor of Q17, the voltage on the base of Q19 will exceed the bias provided by R2-V and Q19 will become conductive; when Q19 conducts Q21 will become conductive so as to energize Relay No. 2. When Relay No. 2 is energized the lower, normally open, contact thereof is closed to energize the brakes, while the upper, normally closed, contact thereof will be opened to interrupt the transmission of the speed signal from Q25 to Q27, thereby stopping the cart.

When the cart is too distant from the operator, or when there is no signal from the transmitter, the potential across the emitter resistor of Q17 will fall below a predetermined value; this is represented by the bias on the emitter of Q18 as provided by R3-V; when the voltage from Q17 drops as a result of the "distant" or no signal condition, the potential on the bias of Q18 will fall below the bias provided by R3-V and Q18 will become conductive; when Q18 conducts, this will make Q20 conductive and, in turn, Q21 will conduct to energize Relay No. 2 so as to put on the brakes and prevent actuation of the Drive Motor M2 as described above.

As indicated previously, transistor Q23 is an emitter follower and the speed signal from point B appears across the emitter circuit of Q23; this signal is amplified by Q24 and Q25. Variable resistors R4-V and R5-V are used to set the distance at which the cart will follow the golfer and for linearity of Speed Control. Transistors Q29 and Q30 form a 100 cps multivibrator circuit whose pulse width is variable dependent upon the voltage developed at point B; the latter voltage, as indicated above, is amplified by transistors Q24 and Q25 and is applied to transistors Q27 and Q28 which feed into the multivibrator circuit at Q29. The arrangement of the transistors is such that, the greater the voltage at point B, the narrower the pulse width of the signal from Q30; conversely, a lesser voltage from point B will increase the pulse width of the signal from Q30. The pulses from Q30 are fed into transistor Q31, the driver for transistor Q32 which controls current to the Drive Motor. Although only one transistor Q32 is shown, it is preferable that two such transistors are connected in parallel to handle the current requirements for the Motor M2.

As indicated above, the cart will stop when it is too near or too far from the transmitter. Also, when the cart is within the control limits of the transmitter, the width of the pulses from Q30 varies inversely with respect to the strength of the signal from point B. This means that the cart will tend to move at a greater speed when it is more distant from the transmitter and will tend to slow down somewhat as it approaches the transmitter. The amplitude of these variable-width pulses, however, is from zero to a constant twelve volts; this assures the transistor Q32 (or its parallel transistor) is either fully turned off or fully saturated so as to prevent the dissipation of heat, resulting in better driving efficiency. Diode 21 and the capacitor in parallel therewith serve to suppress back EMF to prevent damage to transistor Q32.

Transistor Q26 and its associated circuitry represent a Speed Control for the Drive Motor. A tach coil in the base-emitter circuit of Q26 is physically located adjacent the gear on the Drive Motor. This tach coil is a magnetic pickup coil whose field embraces the teeth on the gear referred to above. As the gear teeth pass through the magnetic field of the tach coil they will create an AC signal whose frequency will vary with the speed of this gear and, in turn, the speed of the Drive Motor. Diodes D19 and D20 form a circuit that will develop a DC voltage dependent upon the frequency of the AC signal applied to Q26 from the tach coil; this voltage is applied to the base of Q27 and serves to maintain speed regardless of the load on the Drive Motor.

Transistors Q34, Q35, Q36 and Q37 make up a partial magnetic braking circuit. The coil in the collector circuit of Q37 will be energized when two voltage conditions occur simultaneously; first, the voltage at point B must be sufficient to make Q35 conduct, and, secondly, the voltage applied to the base of Q34 from point C must be sufficient to make Q34 and Q36 conduct. These two latter conditions would occur while the cart was running on a downgrade; thus, the above circuit would actuate the coil to prevent the cart from overtaking the golfer. The coil itself is physically one of the coils in the motor. The actuation of this coil in the manner described above would serve as a magnetic (dynamic) brake on the motor which tends to drive the motor backwards to slow it down.

At the central lower portion of FIG. 3B, there is indicated "N.O. Switch" which stands for a normally opened switch which can be used for manual control of the cart. Actually, there is a handle which telescopes into the cart. When the handle is pulled out for manual towing purposes, it can be rotated to close the switch described. Closing of the switch will energize Relay No. 3. When Relay No. 3 is energized, its lowermost, normally closed, contact is opened to prevent actuation of the Brakes. Its intermediate, normally closed, contact is opened to prevent the speed signal from passing from transistor Q25 to Q27; its uppermost, normally opened, contact is closed to put an adjustable twelve volt bias on the emitter of Q27 which will, ultimately, energize motor M2 to drive the cart forwardly. It may be desirable to lead the cart manually over a bridge, for example, where the cart would normally be de-energized because of the close proximity of the operator. Thus, the manual controls, as in this case, should be capable of interrupting or overriding the otherwise normal operation of the cart.

Turning now to FIG. 4, the transistor Q28 and the crystal ("XTAL"), make up a 1715 K.C. oscillator circuit. The secondary of transformer T6 is connected to plus nine volts through the resistor as shown (after the switch below the 9 volt battery has been closed). The other end of the secondary is connected to plus 9 volts through the capacitor as shown, thereby creating a 90 degree phase shift between bases of Q39 and Q40. As will hereinafter appear, this phase shift is quite important because the desired end result is to feed two transmitting antennae out of phase by 90°. The various components shown in FIG. 4 are mounted in a container or case which will be approximately the size of a package of cigarettes so as to permit the operator to carry the transmitter in one of his rear pants pcokets, for example. The antennae are physically mounted with their longitudinal axes substantially horizontal, with one antennae slightly above the other, and so that they are substantially at ninety degrees with respect to each other. Thus, the antennae physically resemble a turnstile and radiate signals to the receiver even though the operator might be turned somewhat from a forward direction of movement. Fine adjustment of phasing is accomplished by the trimmer capacitors associated with the antennae.

FIGS. 5 and 6 show details of the receiving and transmitting antennae, respectively. In FIG. 5, there is shown a receiving antenna consisting of a ferrite rod 10 approximately three and ¼ inches long and approximately ½ inch in diameter. There is a primary winding 12 which includes 16 turns of 0.05 inch diameter enameled wire. At the right hand end of the rod 10 is a secondary winding 14 of approximately six turns of the same type of wire and wound on the rod between the adjacent turns of the winding 12. A variable capacitor 16 (Arco 463) is connected across the ends of the wire 12. Referring now briefly to FIG. 3A, the winding 14 for antenna No. 1 would be the one connecting with the base of Q5, and the primary winding 12 is shown to the left thereof with an added fixed capacitor connected in parallel with the variable capacitor. The same considerations hold true for antenna No. 2. The receiving antennae (only one of which is shown in FIG. 5 for the sake of simplicity) are physically mounted so as to turn with the front wheel. The cart (not shown) is similar to a child's tricycle with the handle bars omitted. The fork upon which the front wheel is mounted extends slightly upwardly beyond the bearings for the fork and the antennae are mounted on this extension so as to rotate with the front wheels. Each antenna is mounted so that its longitudinal axis is substantially horizontal. One antenna is mounted slightly above the other substantially at 90° relative thereto in turnstile fashion. The vertical plane of the front wheel will bisect the angle formed by the two antennae.

Referring now to FIG. 6, the transmitter antennae, only one of which is shown in this Figure for convenience, are made from a ferrite rod 18 approximately 1 inch long and approximately ½ inch in diameter. The rod 18 has wound thereon a coil 20 of approximately thirteen turns and made from No. 16 enameled wire. The ends of the winding are shown as leads 22 and 26. An intermediate tap 24 is provided approximately four turns to the left of the lead 26. Referring briefly now to FIG. 4, as far as Antenna No. 3 is concerned, the coil 20 would be connected in such a way that the lead 26 would connect with the collector of Q39 and the intermediate tap 24 would connect with the primary of T6. The lead 22 would connect to the fixed and variable capacitors which are parallel with each other and with the entire coil 20. The same considerations hold true for antenna No. 4.

As indicated before, the cart is basically in the form of a child's trycycle with an upper surface adapted to hold a golf bag. Of course, the cart could be otherwise shaped and could be provided with four wheels, if desired, instead of three. Thus, the mechanical details of the cart are not considered as substantial and are not shown. A single battery or any combination of batteries, in series or in parallel, can be used to provide the desired 12 volts to operate the cart. The motor M2 is used to drive the rear wheels preferably in tandem and through any convenient gearing or belting as desired. The brakes are also preferably associated with the rear wheels. The steering motor M1 is preferably mounted adjacent the front or steerable wheel. A gear sector can be mounted on the fork in such a manner as to mesh with a worm gear, for example, driven by the motor M1. Any other acceptable means of imparting steering motion from the steer motor would be acceptable. Whether or not the steerable wheel is at the front or rear of the cart is not material. Obviously, if the steerable wheel were at the rear, the power wheels would rotate in a reverse direction. Again, the single steerable wheel could be replaced by a pair of steerable wheels in parallel. Furthermore, although it might be inconvenient to do so, it is possible that the steerable wheel or wheels could also be the driving wheel or wheels for imparting motion to the cart.

The coupling between the transmitter and receiver in the present invention is substantially electromagnetic as shown and described. This will tend to prevent interference with and from normal radio and television transmissions. However, the basic principles of this invention involve a (golf bag) cart capable of following a movable transmitter from a predetermined maximum distance to a predetermined minimum distance, and simultaneously capable of changing its (the cart's) direction of movement to correspond with changes in movement of the transmitter when deviating from a true straight-ahead direction of movement. With the above principles in mind, it is conceivable that electrostatic or acoustic coupling between the receiver and transmitter could be utilized to accomplish the same result.

Whereas the present invention has been described in particular relation to the drawings, sketches and diagrams included herein, other and further modifications apart from those shown or suggested herein may be made within the spirit and scope of this invention.

What is claimed is:

1. A movable, steerable vehicle adapted to follow the movements of a movable transmitter providing transmitted signals, said vehicle comprising means for receiving said transmitted signals, motive means for propelling said vehicle along the ground, speed control means responsive to a speed voltage signal from said receiving means for energizing said motor means to propel said vehicle along the ground, and stop control means responsive to the speed voltage signals from said receiving means below a predetermined minimum signal strength or above a predetermined maximum signal strength for causing said speed control means to deenergize said motive means such that said motive means is prevented from moving said vehicle along the ground.

2. The structure set forth in claim 1 wherein said vehicle includes voltage comparison means receiving signals from said receiving means to provide said speed voltage signals to said stop means and said speed control means, said speed voltage signal being diminished as the distance between the transmitter and the vehicle increases, said motive means propelling the vehicle along the ground at a speed inversely related to the strength of said speed voltage signals whereby the vehicle is propelled toward the transmitter unless the strength of said speed voltage signal is larger than said predetermined maximum strength or smaller than said predetermined minimum signal strength.

3. The structure set forth in claim 2 wherein said voltage comparison means includes means for providing a steering voltage signal and wherein said vehicle includes steering control means responsive to said steering voltage signal for providing signals representative of the relative position of the transmitter relative to the vehicle.

4. The structure set forth in claim 1 wherein said stop control means includes brake means for preventing movement of said vehicle along the ground when said speed voltage signals are below said predetermined minimum or above said predetermined maximum signal strengths.

5. A movable transmitter, a movable, steerable vehicle capable of following the movements of said transmitter, said transmitter having means therein for transmitting signals, said vehicle having receiving means therein for receiving said transmitted signals, motive means for moving said vehicle along the ground, a turnable steering wheel assembly associated with said vehicle for steering said vehicle along the ground, steer control means responsive to signals from said receiving means for actuating said steering wheel assembly to direct said vehicle toward said transmitter, said receiving means including directional receiving antenna means operatively connected to said steering wheel assembly for steering rotation therewith relative to the rest of the vehicle.

6. The structure set forth in claim 5 wherein said directional receiving antenna means is provided with at least one pair of directional receiving antennae each having at least one wound coil with a longitudinal axis lying a substantially horizontal plane, said pair of antennae lying closely approximate each other in substantially perpendicular relation.

7. The structure set forth in claim 6 wherein said pair of antennae are mounted in such a manner that the line of direction of travel of said vehicle will bisect the angle formed between the longitudinal axes of the antennae.

8. The structure set forth in claim 7 wherein said transmitter includes a pair of transmitting antennae mutually perpendicular to each other and lying in a substantially horizontal plane.

9. A movable, steerable vehicle capable of following the movements of a transmitter providing transmitted signals, said vehicle comprising receiving means for receiving said transmitted signals, motive means for moving said vehicle along the ground, control means responsive to signals from said receiving means for actuating said motive means to drive said vehicle along the ground, means for sensing the speed of said motive means, and dynamic braking means associated with said motive means and enabled by signals from said speed sensing means due to increases in vehicle speed above a predetermined speed and said signals from said receiving means for slowing said motive means to maintain such at a substantially constant speed when the load thereon decreases such as when descending a grade.

10. The structure set forth in claim 9 wherein said speed sensing means includes tachometer means operatively connected to said motive means to provide an output signal representative of the speed of said vehicle along the ground.

11. A movable, steerable vehicle capable of following the movements of a transmitter providing transmitted signals, said vehicle comprising receiving means for receiving said transmitted signals, motive means for moving said vehicle along the ground, a turnable wheel assembly associated with said vehicle for controlling the direction of vehicle travel, steer control means responsive to processed signals from said receiving means for sensing the position of the transmitter relative to said vehicle and actuating said turnable wheel assembly to direct said vehicle toward the transmitter, and understeer control means associated with said wheel assembly to provide feedback signals to said steer control means representative of the angular position of said turnable wheel assembly with respect to the rest of said vehicle for preventing said wheel assembly from steering to an angular position beyond that necessary to direct the vehicle toward the transmitter.

12. The structure set forth in claim 11 wherein said understeer control means includes electrical circuit means operatively connected to said wheel assembly for steering movement therewith, said circuit means providing understeer signals which are a function of the angular position of the wheel assembly with respect to the vehicle.

13. The structure set forth in claim 12 wherein said electrical circuit means comprises variable electrical resistance means.

* * * * *